United States Patent

Taylor et al.

(10) Patent No.: US 9,840,166 B2
(45) Date of Patent: Dec. 12, 2017

(54) DETERMINING THE NUMBER OF PEOPLE IN A VEHICLE

(71) Applicant: Verizon Patent and Licensing Inc., Arlington, VA (US)

(72) Inventors: Thomas Steven Taylor, Atlanta, GA (US); James Ronald Barfield, Jr., Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 109 days.

(21) Appl. No.: 14/684,807

(22) Filed: Apr. 13, 2015

(65) Prior Publication Data

US 2016/0297324 A1  Oct. 13, 2016

(51) Int. Cl.
*B60N 2/00* (2006.01)
*B60H 1/00* (2006.01)
*G06N 3/08* (2006.01)
*G06F 1/32* (2006.01)

(52) U.S. Cl.
CPC ......... *B60N 2/002* (2013.01); *B60H 1/00735* (2013.01); *B60H 1/00742* (2013.01); *B60H 1/00757* (2013.01); *G06F 1/3206* (2013.01); *G06N 3/08* (2013.01)

(58) Field of Classification Search
CPC ......... B60N 2/002; G06N 3/08; H04W 4/008; H04L 12/2827; B60R 25/2036; G07C 5/0008
See application file for complete search history.

(56) References Cited

U.S. PATENT DOCUMENTS

| 5,538,099 | A  | * | 7/1996 | Blackburn | B60R 21/0132 180/282 |
|---|---|---|---|---|---|
| 6,922,622 | B2 | * | 7/2005 | Dulin | B06B 1/0215 180/272 |
| 2011/0084807 | A1 | * | 4/2011 | Logan | H04Q 9/00 340/10.1 |
| 2012/0283894 | A1 | * | 11/2012 | Naboulsi | A61B 5/18 701/1 |
| 2014/0244106 | A1 | * | 8/2014 | Singer | G06F 17/00 701/36 |
| 2014/0306826 | A1 | * | 10/2014 | Ricci | H04W 48/04 340/573.1 |
| 2015/0120336 | A1 | * | 4/2015 | Grokop | B60W 40/09 705/4 |
| 2015/0351663 | A1 | * | 12/2015 | Zigel | A61B 5/4803 600/586 |

* cited by examiner

*Primary Examiner* — Abby Lin

(57) ABSTRACT

A computer device may include logic configured to detect a wake up event that wakes the computer device from an idle mode, wherein the wake up event indicates that a user is getting ready to use a vehicle; obtain accelerometer data from an accelerometer, associated with the vehicle, during a time period that includes the wake up event; determine a number of door slam events during the time period based on the obtained accelerometer data; and determine a number of people in the vehicle based on the determined number of door slam events.

20 Claims, 8 Drawing Sheets

US 9,840,166 B2

DETERMINING THE NUMBER OF PEOPLE IN A VEHICLE

BACKGROUND INFORMATION

A vehicle may include a computer device that collects information relating to the vehicle. For example, the computer device may collect information relating to the number of miles the vehicle was driven in a particular time period, the times during the vehicle was driven, or the locations through which the vehicle was driven. Such information may be collected for a variety of purposes, including for providing a variety of services to subscribers or customers.

DETAILED DESCRIPTION OF PREFERRED EMBODIMENTS

Figure 1:
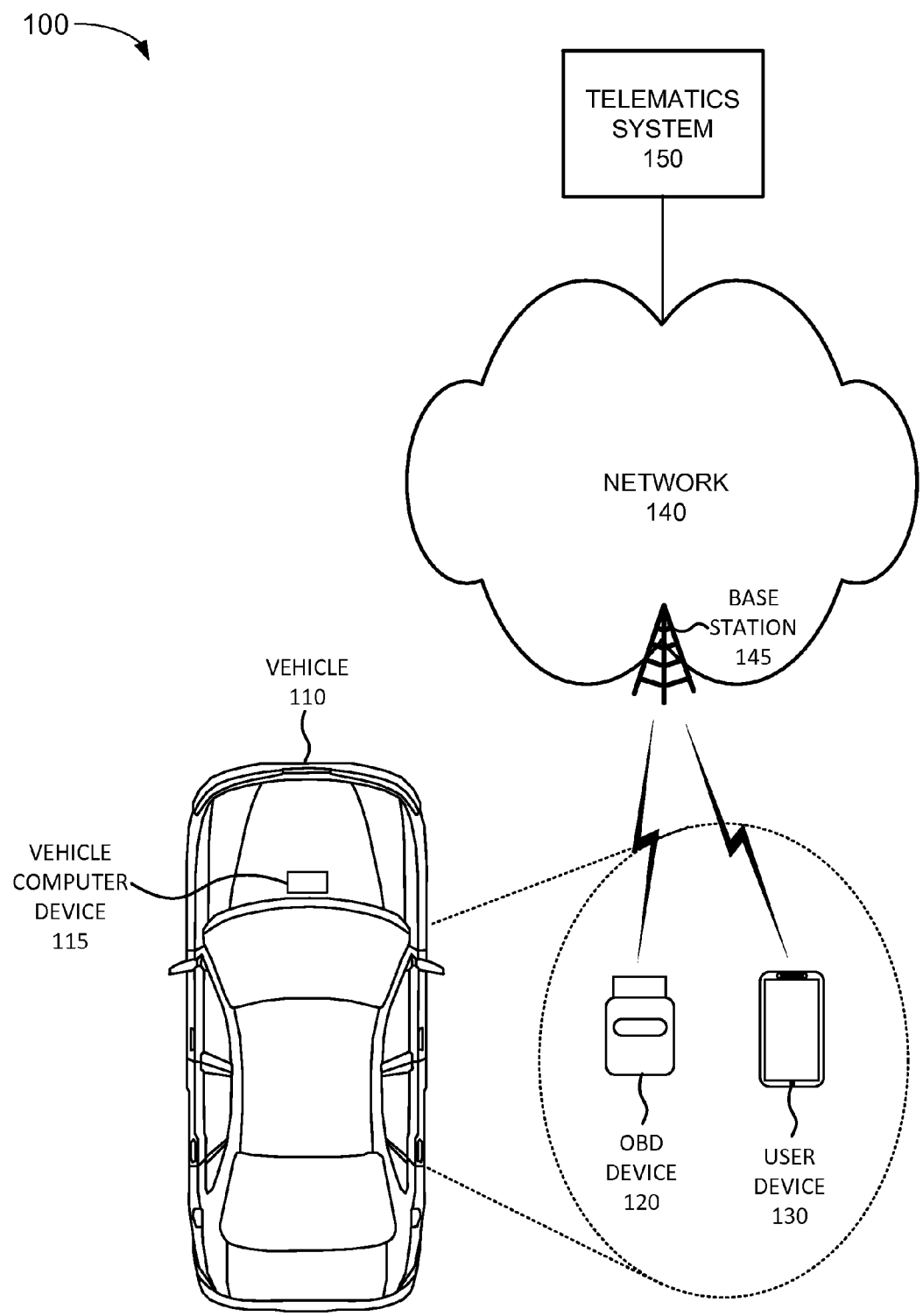
FIG. 1 is a diagram illustrating an environment according to an implementation described herein.

The following detailed description refers to the accompanying drawings. The same reference numbers in different drawings identify the same or similar elements.

Implementations described herein relate to determining the number of people in a vehicle. In some implementations, the number of people in a vehicle may be determined based on the number of door closing events (referred to herein as "door slam events"). For example, a telematics device, such as an on-board diagnostics device, a vehicle computer device, or a mobile communication device (e.g., smartphone, smartwatch, feature phone, cell phone, tablet, phablet, smart pendant and/or other smart wearable device, etc.) associated with a user of the vehicle, may detect a wake up event that indicates that the user is getting ready, or preparing, to use the vehicle. The wake up event may include detecting an unlocking of the vehicle, detecting an opening, or closing, of a door or trunk of the vehicle, detecting a short range wireless signal associated with the mobile communication device associated with the user, and/or another type of indication that the user is preparing to use the vehicle.

In response, the telematics device may obtain sensor data from an accelerometer and/or other sensors (e.g., a weight sensor, a proximity sensor, a weight sensor, a camera, a barometer, a biometric sensor, a sound sensor, a light sensor, and/or another type of sensor) associated with vehicle, such a sensor included in an on-board diagnostics device, a sensor installed in the vehicle, and/or a sensor in a mobile communication device located inside the vehicle. The telematics device may maintain a buffer that stores the sensor data (e.g. accelerometer data, audio wave form, image data, and/or other data obtained from the sensors) and may analyze a time period before and after the wake up event to detect data patterns associated with door slam events. Whenever a door is closed or slammed shut, the vehicle may shake and activate the accelerometer. Each person entering the vehicle may close a door and thus the telematics device may determine the number of people in the vehicle based on the number of detected door slam events. A filter may be applied to the accelerometer data to filter out any waveforms that do not correspond to a door slam event. The time period to detect door slams may end when a particular event occurs, such as when the ignition is started, when the vehicle begins to move, and/or when another type of event occurs that is indicative that people have finished entering the vehicle.

In other implementations, alternative or additional information may be used to determine the number of people in the vehicle. For example, the telematics device may obtain audio data from a microphone during the time period that includes the wake up event, may obtain data relating to mobile communication devices in the vehicle during the time period that includes the wake up event, may obtain data from one or more sensors in the vehicle during the time period that includes the wake up event, and/or may obtain other types of additional data and may use the obtained alternative/additional data to determine the number of people in the vehicle. The additional types of input may be useful to offset misleading door slam information, such as if two passengers get into vehicle 110 through the same door or if one person enters and then exits the vehicle.

The obtained information may be inputted into a classifier that is trained to classify the combined data into classes representing different numbers of people in the vehicle. The classifier may include a neural network classifier, a support vector machine classifier, a logistic regression classifier, and/or another type of classifier. The classifier may be trained to distinguish between different types of signals, such as the difference between accelerometer or audio signals of a door slam or a trunk being closed.

In some implementations, data may be recorded from one or more acceleration sensors (and/or other types of sensors) after acceleration readings exceed a threshold that indicates movement in the vehicle or within a particular distance of the vehicle. Prior to any detected movement and/or after the movement is detected, data may be obtained from the one or more sensors and processed. The obtained data may include raw sensor values and/or mathematically defined features extrapolated from the sensor readings. For example, the sensor information may include accelerometer data, audio data, magnetometer data, information reported by a mobile communication device (e.g., smartphone), and/or other types of information obtained from sensors or other devices inside the vehicle or within a particular distance of the vehicle.

The sensor information may be processed by techniques such as pattern recognition techniques and/or other machine learning techniques to provide a prediction of a door opening, or a particular number of doors opening, to determine the number of persons within the vehicle. Machine learning methods may be used with training sets of data that correspond to raw data inputs, and/or features mathematically extracted from the sensor information, that map to the desired outcome of prediction. The raw data and/or extracted features may be collected during events with predefined outcomes, such as a particular number of people getting into a particular vehicle (e.g. collecting sets of data corresponding to one person entering the vehicle, multiple people entering a vehicle, a trunk closing event, people entering different vehicle makes, models, and/or types, etc.) such that the machine learning method may be trained to provide a defined prediction. Examples of features extracted and used during learning as well as classification after learning may include a magnitude of the acceleration or other parameters, derivatives of one or more parameters, integrals of one or more parameters, and/or other mathematical derivations that operate on the received sensor information.

The information identifying the number of people in the vehicle may be used for one or more purposes. As an example, the information identifying the number of people in the vehicle may be used for usage-based insurance by reporting the information to a system configured to collect usage-based insurance information, such as a server device associated with an insurance provider. As another example, the information identifying the number of people in the vehicle may be used to send an alert to a mobile communication device if the number of people in the vehicle exceeds a threshold. For example, parents may not want their child to drive with other passengers in the vehicle and may configure the telematics device to generate an alert if the vehicle includes more than one person. As yet another example, the information identifying the number of people in the vehicle may be used to adjust one or more vehicle settings, such as audio speakers, heating or air conditioning vents, seat belt alarms, a rear seat display device, and/or other types of vehicle settings.

FIG. 1 is a diagram illustrating exemplary components of an environment 100 according to an implementation described herein. As shown in FIG. 1, environment 100 may include a vehicle 110, an on-board diagnostics (OBD) device 120, a user device 130, a network 140, and a telematics system 150.

Vehicle 110 may include a sedan, a sports utility vehicle (SUV), a truck, a van, and/or another type of vehicle. Vehicle 110 may include a user's personal vehicle, a business vehicle, a rental vehicle, and/or a vehicle used for another purpose by a user. Vehicle 110 may include one or more doors. For example, if vehicle 110 is a sedan, vehicle 110 may include a front driver's side door, a front passenger's side door, a rear driver's side door, and a rear passenger's side door. Furthermore, vehicle 110 may include a trunk door and a hood. Vehicle 110 may include fewer doors, additional doors, different types of doors, and/or differently arranged doors. Vehicle 110 may include a vehicle computer device 115.

Vehicle computer device 115 may manage one or more functions of vehicle 110 and/or may collect information relating to vehicle 110. For example, vehicle computer device 115 may manage the functionality of various components of vehicle 110, may collect data about the status of the components of vehicle 110, may report error codes received from components of vehicle 110, may collect telematics information relating to vehicle 110 such as the location of vehicle 110, the speed of vehicle 110, the miles per gallon fuel consumption of vehicle 110, etc. Vehicle computer device 115 may obtain sensor information from one or more sensors located in vehicle 110, such as an accelerometer, a door sensor, a proximity sensor, a weight sensor, a dashboard camera, and/or other types of sensors. Furthermore, vehicle computer device 115 may control one or more vehicle settings, such as audio speakers, heating or air conditioning vents, seat belt alarms, a rear seat display device, and/or other types of vehicle settings.

OBD device 120 may include a device, such as a dongle device, that may be plugged into an OBD port in vehicle 110, such as an OBD-II port or another type of OBD port. The OBD port may be located, for example, inside vehicle 110, such as on the dashboard, under the steering wheel, or in another location. OBD device 120 may interface with vehicle computer device 115 and/or with other vehicle components of vehicle 110, may obtain diagnostics and/or telematics information about vehicle 110, and my report the obtained information to telematics system 150. OBD device 120 may include an accelerometer that may be used to determine the number of door slams associated with a wake up event. Furthermore, OBD device 120 may obtain sensor information from vehicle computer device 115 and may determine the number of people in the vehicle based on the obtained sensor information and/or based on the number of detected door slam events. Moreover, OBD device 120 may communicate with mobile communication devices located in the vehicle, such as user device 130 and may use information relating to the mobile communication devices to further determine the number of people in the vehicle. OBD device 120 may report the number of people in the vehicle to telematics system 150 and/or to another device. Furthermore, OBD device 120 may instruct vehicle computer device 115 to adjust one or more vehicle settings based on the number of people in the vehicle.

User device 130 may be associated with a driver of vehicle 110 or with one of the passengers. User device 130 may include a mobile communication device such as a mobile phone, a smart phone, a tablet computer, a laptop computer, a phablet computer device, a wearable computer device (e.g., a glasses smartphone device, a wristwatch smartphone device, etc.), and/or any other type of mobile computer device with wireless communication and output capabilities. User device 130 may communicate with OBD device 120 using a short range wireless communication protocol (e.g., Bluetooth, WiFi, etc.).

Network 140 may include one or more circuit-switched networks and/or packet-switched networks. For example, network 140 may include a local area network (LAN), a wide area network (WAN), a metropolitan area network (MAN), a Public Switched Telephone Network (PSTN), an ad hoc network, an intranet, the Internet, a fiber optic-based network, a wireless network, a satellite network, and/or a combination of these or other types of networks. Network 140 may include base station 145. Base station 145 may function as a base station that enables vehicle computer device 115, OBD device 120, and/or user device 130 to wirelessly communicate with network 140. For example, base station 145 may include a Long Term Evolution eNodeB base station, a Global System for Mobile Communications (GSM) base station, a Code Division Multiple Access (CDMA) base station, and/or another type of base station.

Telematics system 150 may include one or more devices, such as computer devices and/or server devices, which are configured to receive telematics information from OBD device 120 and/or from vehicle computer device 115. Furthermore, in some implementations, telematics system 150 may perform some or all of the processing for determining the number of people in vehicle 110. In other implementations, telematics system 150 may receive information identifying the number of people in vehicle 110 from vehicle computer device 115, OBD device 120, and/or user device 130. Telematics system 150 may interface with other systems (not shown in FIG. 1), such as a system that keeps track of usage-based insurance and may provide the received information identifying the number of people in vehicle 110 to the other system. In some implementations, telematics system 150 may be included on board of vehicle 110.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
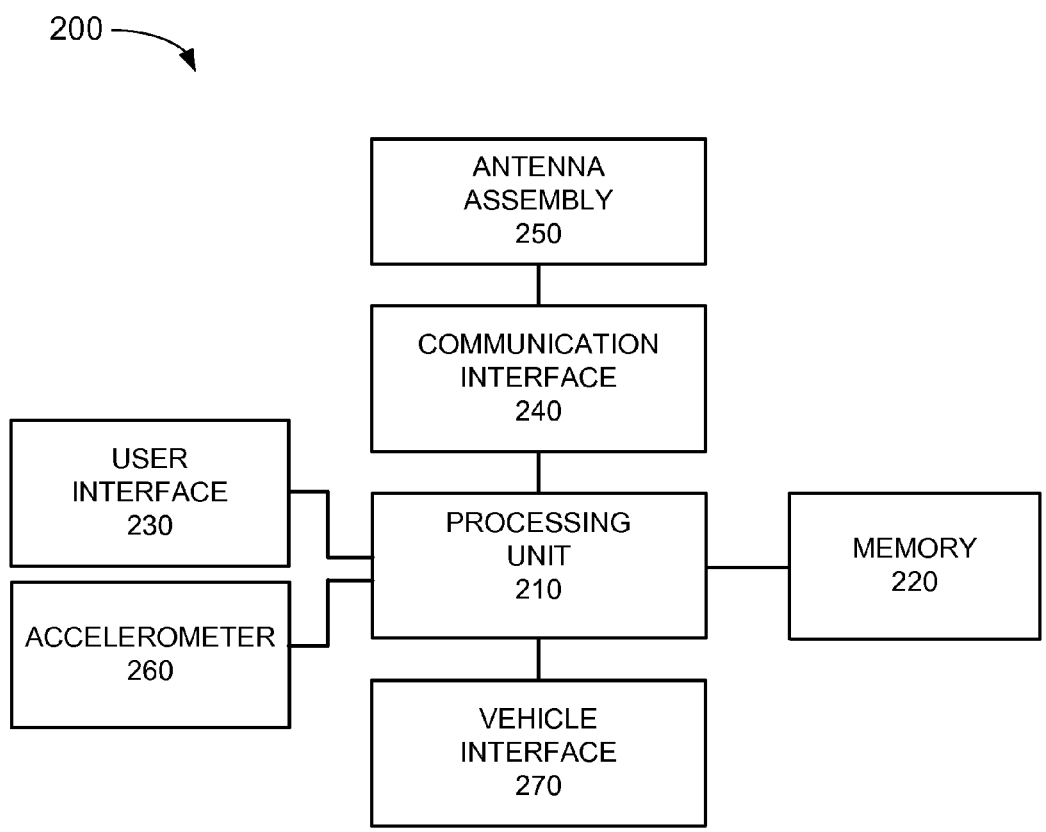
FIG. 2 is a diagram illustrating exemplary components of the on-board diagnostics device, user device, or vehicle computer of FIG. 1.

FIG. 2 is a diagram illustrating exemplary components of device 200 according to an implementation described herein. Vehicle computer device 115, OBD device 120, and/or user 130 may each include one or more devices 200. As shown in FIG. 2, device 200 may include a processing unit 210, a memory 220, a user interface 230, a communication interface 240, and an antenna assembly 250. If device 200 is included in OBD device 120, device 200 may further include an accelerometer 260 and a vehicle interface 270.

Processing unit 210 may include one or more processors, microprocessors, application specific integrated circuits (ASICs), field programmable gate arrays (FPGAs), and/or other processing logic. Processing unit 210 may control operation of device 200 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may allow a user to input information to device 200 and/or to output information from device 200. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 200 to vibrate; a sensor; and/or any other type of input or output device.

Communication interface 240 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals via an antenna and receive RF signals from an antenna and provide them to communication interface 240.

As described herein, device 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Accelerometer 260 may be configured to measure acceleration of device 200. Accelerometer 260 may include a piezoelectric, piezoresistive, capacitive, micro electro-mechanical system (MEMS), and/or another type of accelerometer 260. Accelerometer 260 may record vibrations of device 200 in response to a door slam, a trunk being closed, and/or a hood being closed on vehicle 110.

Vehicle interface 270 may include one or more ports and associated logic to communicate with vehicle computer device 115 and/or other electronic components of vehicle 110. For example, vehicle interface 270 may include an OBD I port, an OBD II port, and/or another type of vehicle interface.

Although FIG. 2 shows exemplary components of device 200, in other implementations, device 200 may include fewer components, different components, differently arranged components, or additional components than those depicted in FIG. 2. Additionally or alternatively, one or more components of device 200 may perform the tasks described as being performed by one or more other components of device 200.

Figure 3:
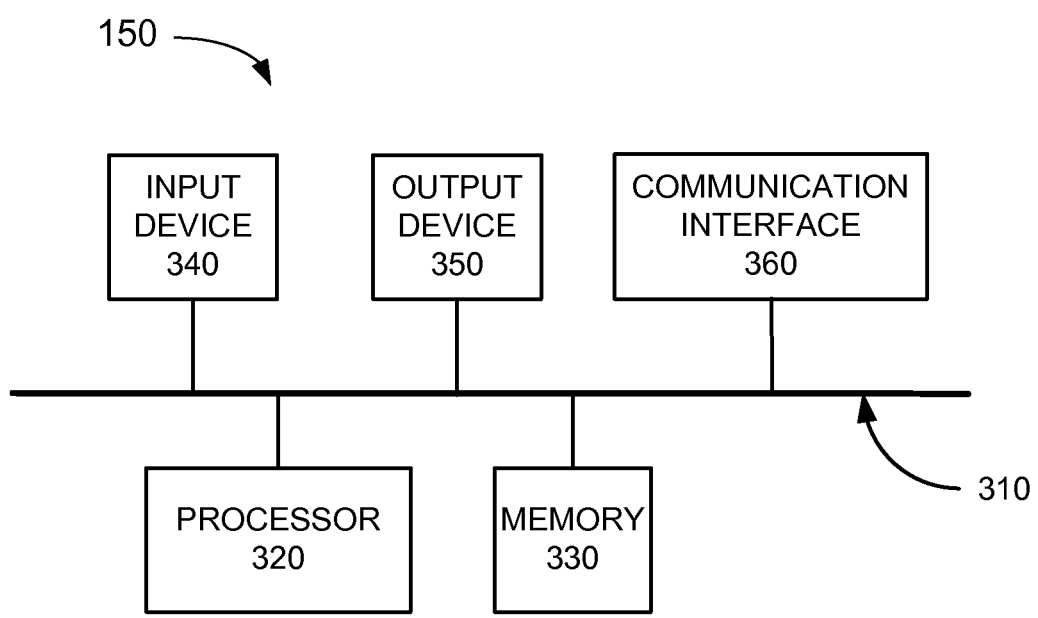
FIG. 3 is a diagram illustrating exemplary components of the telematics system of FIG. 1.

FIG. 3 is a diagram illustrating exemplary components of telematics system 150 according to an implementation described herein. As shown in FIG. 3, telematics system 150 may include a bus 310, a processor 320, a memory 330, an input device 340, an output device 350, and a communication interface 360.

Bus 310 may include a path that permits communication among the components of telematics system 150. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into telematics system 150. Input device 340 may include, for example, a keyboard, a mouse, a pen, a microphone, a remote control, an audio capture device, an image and/or video capture device, a touch-screen display, and/or another type of input device. In some embodiments, telematics system 150 may be managed remotely and may not include input device 340. In other words, telematics system 150 may be "headless" and may not include a keyboard, for example.

Output device 350 may output information to an operator of telematics system 150. Output device 350 may include a display, a printer, a speaker, and/or another type of output device. For example, telematics system 150 may include a display, which may include a liquid-crystal display (LCD) for displaying content to the customer. In some embodiments, telematics system 150 may be managed remotely and may not include output device 350. In other words, telematics system 150 may be "headless" and may not include a display, for example.

Communication interface 360 may include a transceiver that enables telematics system 150 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, telematics system 150 may perform certain operations relating to determining the number of people in a vehicle and/or reporting the number of people in the vehicle. Telematics system 150 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of telematics system 150, in other implementations, telematics system 150 may include fewer components, different components, additional components, or differently arranged components than those depicted in FIG. 3. Additionally or alternatively, one or more components of telematics system 150 may perform one or more tasks described as being performed by one or more other components of telematics system 150.

Figure 4:
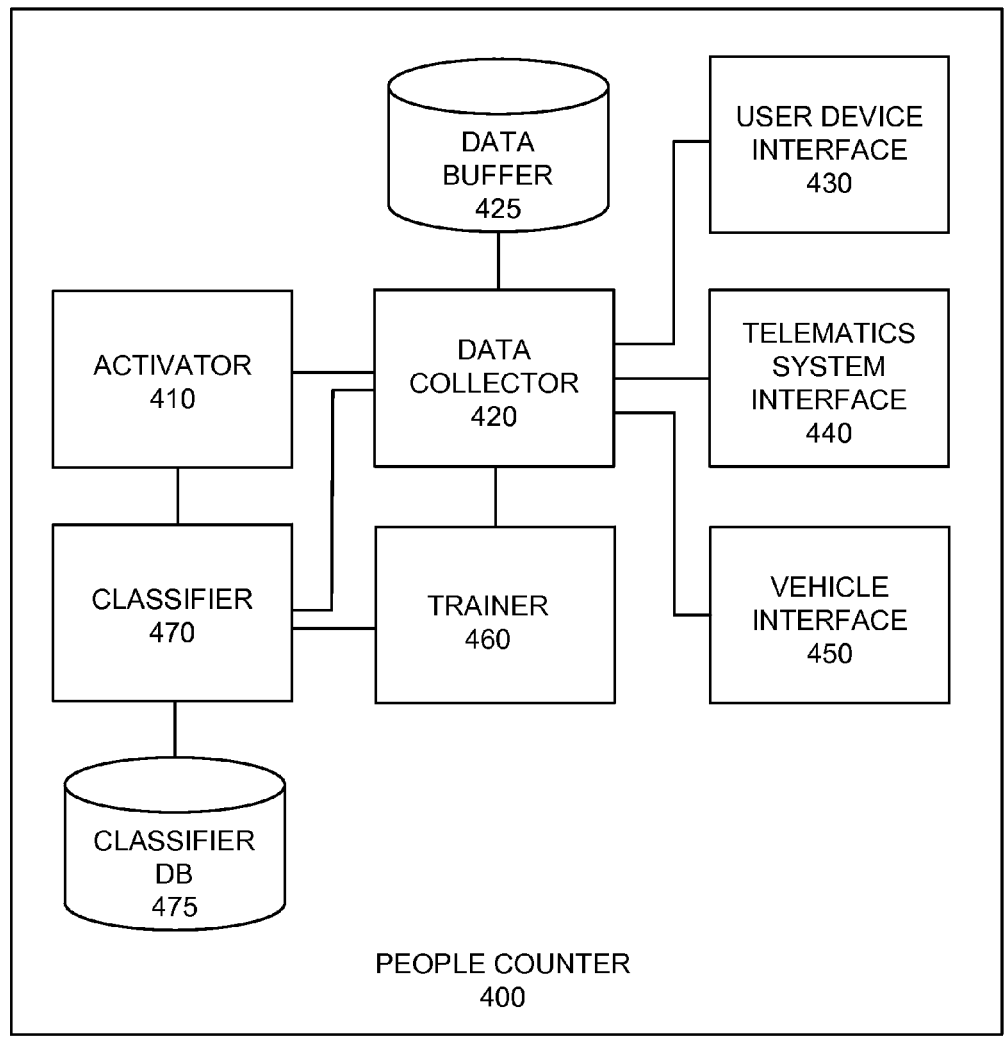
FIG. 4 is a diagram illustrating exemplary functional components of a people counter that may be implemented in one or more of the devices of FIG. 1.

FIG. 4 is a diagram illustrating exemplary functional components of a people counter 400 according to a first implementation described herein. People counter 400 may be implemented, for example, via processing unit 210 of device 200 (e.g., OBD device 120, vehicle computer device 115, user device 130, etc.) executing instructions from memory 220. Alternatively, some or all of the functionality of people counter 400 may be implemented via hard-wired circuitry. In other implementations, some or all of the functionality of people counter 400 may be implemented via processor 320 executing instructions from memory 330 of telematics system 150.

As shown in FIG. 4, people counter 400 may include an activator 410, a data collector 420, a data buffer 425, a user device interface 430, a telematics system interface 440, a vehicle interface 450, a trainer 460, a classifier 470, and a classifier database (DB) 475.

Activator 410 may activate people counter 400 in response to detecting a wake up event. The wake up event may include detecting an unlocking of the vehicle, detecting an opening of a door or trunk of the vehicle, detecting a short range wireless signal associated with a user's mobile communication device, and/or another type of indication that the user is getting ready to use the vehicle. Activator 410 may instruct data collector 420 to collect data associated with the wake up event.

Data collector 420 may collect data from one or more data sources and may store the data in data buffer 425. In some implementations, data collector 420 may collect the data at particular intervals, even if device 200 is in an idle mode, so that data collected in a time period before the wake up event (e.g., a few seconds before the wake up event) may be obtained. Thus, data buffer 425 may be re-written at particular intervals and may include the most recently obtained data before and after the wake up event. Data collector 420 may collect data from accelerometer 260 and/or other accelerometers, from one or more microphones, from one or more user devices 130 and/or from base station 145, from one or more vehicle sensors, and/or from other sources of data. Data collector 420 may provide the collected data to classifier 470.

User device interface 430 may be configured to communicate with user devices 130 located inside, or in the vicinity of, vehicle 110. As an example, user device interface 430 may detect short range wireless signals emitted by user devices 130. As another example, user device interface 430 may request, via a short range wireless signal, information from user device 130, such as location information, audio signals captured by user device 130, whether user device 130 is in motion, etc.

Telematics system interface 440 may be configured to communicate with telematics system 150. For example, in some implementations, telematics system 150 may perform some or all of the processing performed by people counter 400 and people counter 400 may exchange information with telematics system 150. As an example, in some implementations, classifier 470 may be implemented by telematics system 150. As another example, telematics system 150 may obtain information relating to the location of user devices 130 from base station 145 and may provide the obtained information to people counter 400. As yet another example, telematics system 150 may provide training data to trainer 460 in order to train classifier 470 using a particular training data set.

Vehicle interface 450 may be configured to communicate with vehicle computer device 115 and/or with other components of vehicle 110, such as one or more vehicle sensors and/or one or more components with configurable settings. Vehicle interface 450 may utilize an OBD I port, and OBD II port, and/or another type of port.

Trainer 460 may train classifier 470 based on one or more sets of training data. Classifier 470 may classify data into a particular class representing a particular number of people in vehicle 110. Classifier 470 may include a neural network classifier (e.g., a perceptron), a support vector machine classifier, a logistic regression classifier, and/or another type of classifier. Classifier 470 may take as input data obtained by data collector 420 and may output a number of people in vehicle 110 based on data stored in classifier DB 475. Exemplary inputs of classifier 470 are described below with reference to FIG. 5.

The training data may include a particular set of inputs that corresponds to a particular number of people getting into vehicle 110. As an example, the training data may include accelerometer data for one door slam associated with an output of one person in the vehicle, accelerometer data for two door slams associated with an output of two people in the vehicle, accelerometer data for three door slams associated with an output of three people in the vehicle, etc. As another example, the training data may include accelerometer data for a trunk closing, accelerometer data for a car hood closing in association with an output that does not count such events towards determining the number of people in the vehicle. Moreover, the training data may include other types of accelerometer data that may lead to misleading results, such as other events that may cause vehicle 110 to vibrate (e.g., another vehicle passing close by, a heavy object being placed in the trunk, nearby construction, etc.). Each type of event may generate a different accelerometer response and classifier 470 may be trained to distinguish such events from door slam events. Events that do not correspond to a door slam event may be filtered out by classifier 470 based on the training set. Furthermore, training sets for different types of vehicles may be generated and utilized for particular types of vehicles. For example, a door slam in a sedan may generate a different accelerometer response than a door slam in a pickup truck. Training data for other types of input may similarly be provided and used to train classifier 470, including audio signals training data, vehicle sensors training data, user device signals, parameterized data (derived and/or obtained directly from sensors) and/or location information training data, etc.

Although FIG. 4 shows exemplary functional components of people counter 400, in other implementations, people counter 400 may include fewer functional components, different functional components, differently arranged functional components, or additional functional components than depicted in FIG. 4. Additionally or alternatively, one or more functional components of people counter 400 may perform functions described as being performed by one or more other functional components of people counter 400.

Figure 5:
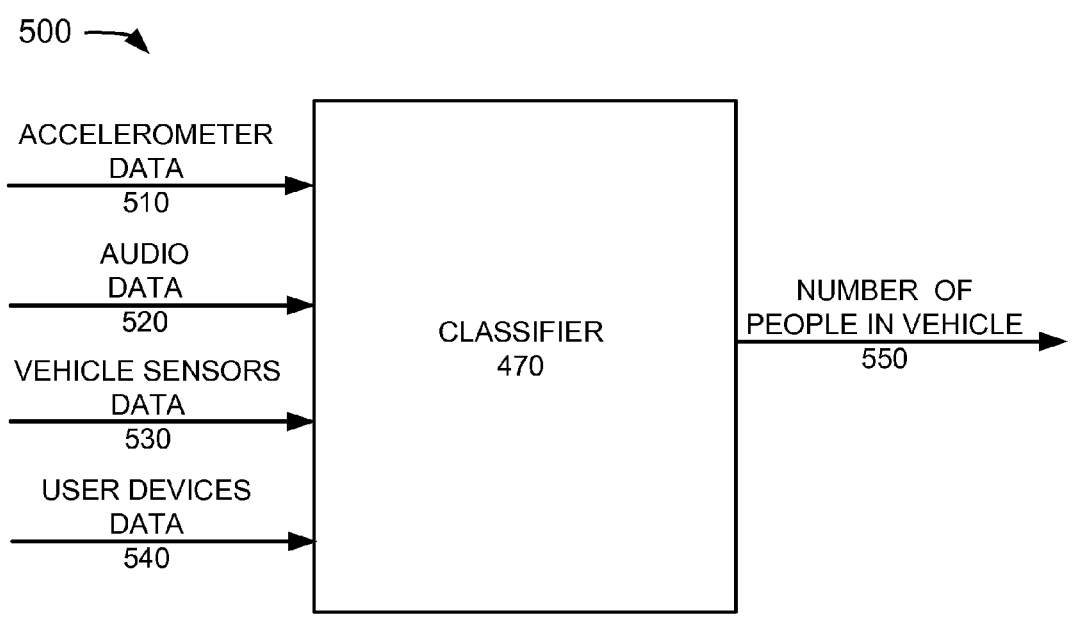
FIG. 5 is a diagram illustrating exemplary inputs of the classifier of FIG. 4.

FIG. 5 is a diagram illustrating exemplary inputs of classifier 470. As shown in FIG. 5, classifier 470 may include an accelerometer data input 510, an audio data input 520, a vehicle sensors data input 530, a user devices data input 540, and a number of people in vehicle output 550. Accelerometer signals input 510 may receive accelerometer data from one or more accelerometer sensors associated with vehicle 110, such as accelerometer 260 and/or another accelerometer included in vehicle 110. The accelerometer data may include an amplitude spike for each door slam event, trunk closing event, and/or hood closing event within a time period before and after a wake up event. Classifier 470 may be trained to distinguish an accelerometer signal based on a door slam from an accelerometer based on a trunk being closed or a hood being closed and may further be trained to exclude trunk closing events and/or hood closing events from counting as a door slam event.

Audio data input 520 may receive microphone data from one or more microphones located in vehicle 110, such as a microphone located on the dashboard and providing audio data to vehicle computer device 110, a microphone located in OBD device 120, a microphone located in user device 130, and/or another type of microphone in vehicle 110. The audio data may include sound recordings of door slams and may include a door slam sound for each person that has entered vehicle 110. Additionally or alternatively, the audio data may include sound samples of different voices inside vehicle 110. The number of door slam sounds and/or the number of different voices may be used by classifier 470 to determine the number of people in vehicle 110. Classifier 470 may be trained to distinguish an audio signal based on a door slam from an audio signal based on a trunk being closed or a hood being closed and may further be trained to exclude trunk closing events and/or hood closing events from counting as a door slam event.

Vehicle sensors data input 530 may receive sensor data from one or more sensors located in vehicle 110. Vehicle sensors data may include data from one or more door sensors. A door sensor may indicate whether a particular door of vehicle 110 is open or closed. The number of activated door sensors, and/or information identifying which particular door sensors have been activated, may be provided via vehicle sensors data input 530 to classifier 470.

The vehicle sensors data may include data from one or more proximity sensors, such as a capacitive proximity sensor, a photoelectric proximity sensor, and/or another type of proximity sensor. Proximity sensors may be located near doors of vehicle 110, near seats of vehicle 110, and/or in other locations near where a person might be detected inside vehicle 110. The number of activated proximity sensors, and/or information identifying which particular proximity sensors have been activated, may be provided via vehicle sensors data input 530 to classifier 470.

The vehicle sensors data may include data from a dashboard camera. A dashboard camera may be located on the dashboard of vehicle 110 and may be used, for example, to generate an alarm when the driver exhibits signs of drowsiness. The dashboard camera may be able to capture images of the interior of vehicle 110 and an object recognition process may be performed on the captured images to determine the number of people in the images. The number of people in the images may be provided via vehicle sensors data input 530 to classifier 470.

The vehicle sensors data may include data from weight sensors. For example, one or more seats in vehicle 110 may include a weight sensor to detect whether a weight larger than a threshold is in the seat to determine whether a person is sitting in the seat. The weight sensor may be used, for example, to activate a seat belt sensor or an airbag deployment sensor. The number of activated weight sensors, and/or information identifying which particular weight sensors have been activated, may be provided via vehicle sensors data input 530 to classifier 470.

User devices data input 540 may receive data from one or more user devices located in vehicle 110. As an example, user device 130 may generate short range wireless signals, such as Bluetooth discovery signals, WiFi discovery signals, and/or other types of short range wireless signals. The number of detected short range wireless signals may be provided via user devices data input 540 to classifier 470. As another example, device 200 may request the number of user devices 130 associated with the location of vehicle 110 from base station 145. User devices 130 may be attached to base station 145 and device 200 may also be attached to base station 145. User devices 145 may report their locations to base station 145 and base station 145 may provide anonymized information relating to how many user devices 130 are at the same location as vehicle 110. The number of user devices 130 detected at the location of vehicle 110 by base station 145 may be provided via user devices data input 540 to classifier 470.

Classifier 470 may classify the input data from accelerometer data input 510, audio data input 520, vehicle sensors data input 530, and user devices data input 540 based on classifier model data, stored in classifier DB 475 and generated based on a set of training data, to generate number of people in vehicle output 550.

Although FIG. 5 shows exemplary functional components of classifier 470, in other implementations, classifier 470 may include fewer inputs, different inputs, differently arranged inputs, or additional inputs than depicted in FIG. 5.

Figure 6:
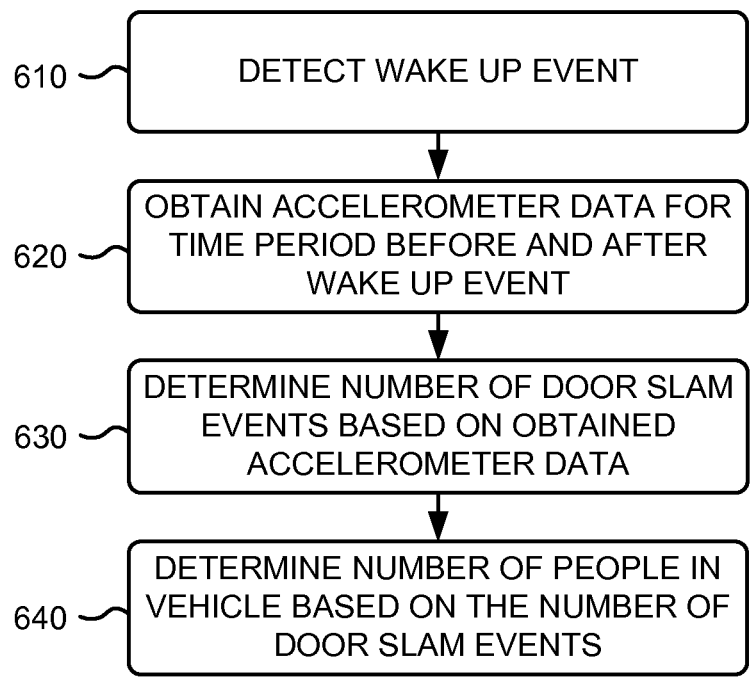
FIG. 6 is a flowchart of a first process for determining the number of people in a vehicle according to an implementation described herein.

FIG. 6 is a flowchart of a first process for determining the number of people in a vehicle according to an implementation described herein. In some implementations, the process of FIG. 6 may be performed by vehicle computer device 115, OBD device 120, or user device 130, either individually or in combination. In other implementations, some or all of the process of FIG. 6 may be performed by another device or a group of devices separate from these devices. For example, some or all of the blocks of process of FIG. 6 may be performed by telematics system 150.

The process of FIG. 6 may include detecting a wake up event (block 610). As an example, device 200 may experience an accelerometer event corresponding to a door being opened. As another example, device 200 may receive an alert from a vehicle door sensor that a door has been unlocked or opened. As yet another example, device 200 may receive an alert from a proximity sensor that a person has approached vehicle 110.

Accelerometer data may be obtained for a time period before and after the wake up event (block 620). For example, data collector 420 of people counter 400 may retrieve accelerometer data from data buffer 425 for the time period immediately prior to the wake up event (e.g., 10 seconds before the wake up event, 5 second before the wake up event, etc.) and may continue to collect accelerometer data for a time period after the wake up event. The time period may end in response to a particular event, such as when vehicle 110 starts to move, when vehicle 110 reaches a certain speed (e.g., 5 miles per hour), when the ignition is started, when the doors are locked, and/or another type of event that indicates people have finished entering vehicle 110.

The number of door slam events may be determined based on the obtained accelerometer data (block 630) and the number of people in the vehicle may be determined based on the number of door slam events (block 640). For example, data collector 420 may provide the collected accelerometer data to classifier 470 and classifier 470 may determine the number of door slam events. The number of door slam events may correspond to the number of people in the vehicle, unless classifier 470 filters out one or more door slam events as false door slam signals (e.g., a trunk closing event). For example, one door slam may be determined to correspond to one person, the driver, in vehicle 110; two door slams may be determined to correspond to a driver and one passenger in vehicle 110; three door slams may be determined to correspond to a driver, a passenger in the front seat, and one person in the back seat, etc.

The number of people in the vehicle may be used for further processing, such as reporting the information to telematics system 150 for usage-based insurance purposes, sending an alert to a mobile communication device if the number of people exceeds a people threshold, adjusting one or more vehicle settings, and/or other type of processing.

Figure 7:
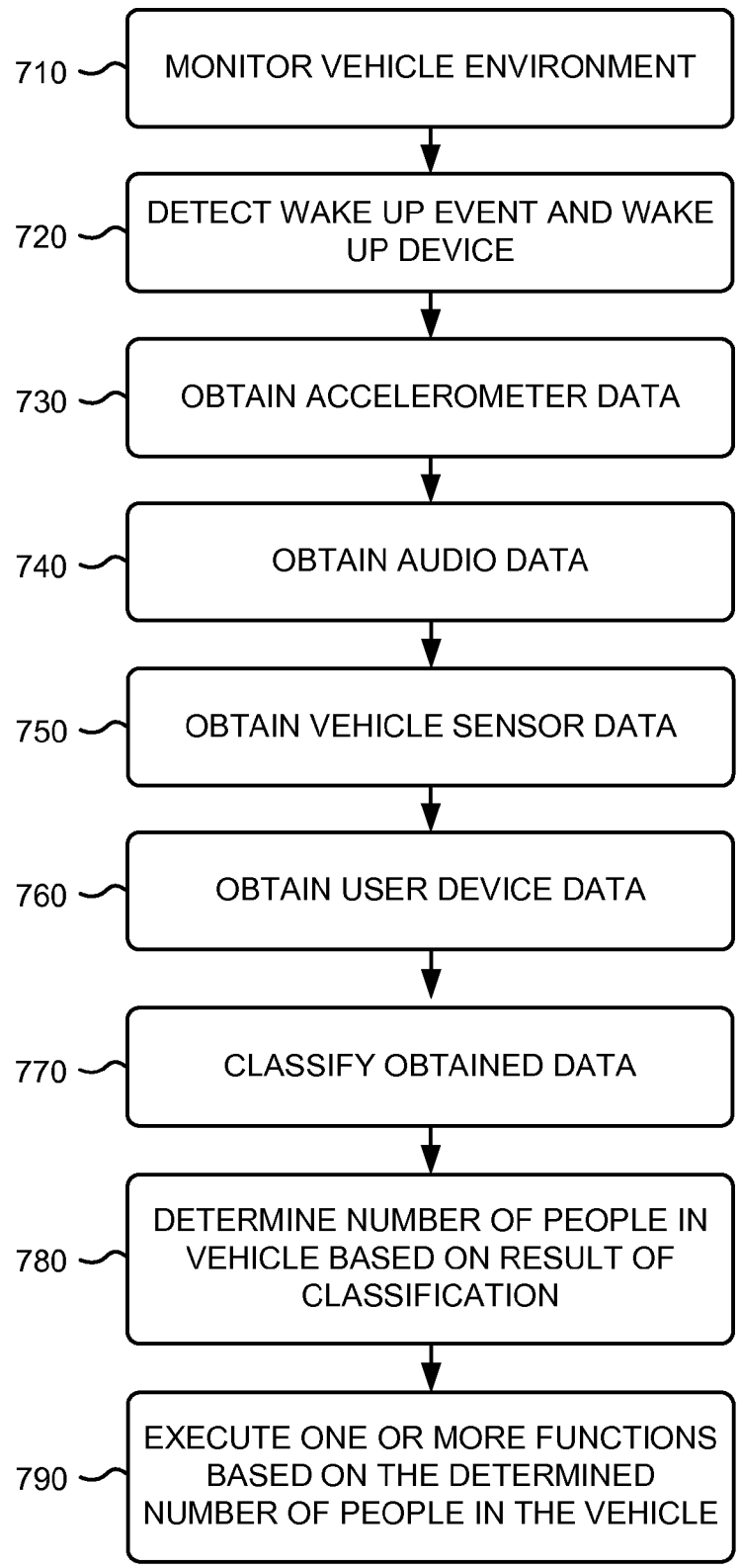
FIG. 7 is a flowchart of a second process for determining the number of people in a vehicle according to an implementation described herein.

FIG. 7 is a flowchart of a second process for determining the number of people in a vehicle according to an implementation described herein. In some implementations, the process of FIG. 7 may be performed by vehicle computer device 115, OBD device 120, or user device 130, either individually or in combination. In other implementations, some or all of the process of FIG. 7 may be performed by another device or a group of devices separate from these devices. For example, some or all of the blocks of process of FIG. 6 may be performed by telematics system 150.

The process of FIG. 7 may include monitoring the vehicle environment (710). For example, people counter 400 may collect accelerometer information, audio information, user devices information, and/or vehicle sensor information and store the collected information in data buffer 425. A wake up event may be detected and the device may be woken up (block 720). For example, device 200 may experience an accelerometer event corresponding to a door being opened, may receive an alert from a vehicle door sensor that a door has been unlocked or opened, may receive a wireless unlock signal from a key fob, may receive an alert from a proximity sensor that a person has approached vehicle 110, may detect a short range wireless signal associated with user device 130, and/or may detect another type of wake up event.

Accelerometer data may be obtained (block 730). For example, data collector 420 may obtain accelerometer data from one or more accelerometer sensors associated with vehicle 110, such as accelerometer 260 and/or another accelerometer included in vehicle 110. The accelerometer data may include an amplitude spike for each door slam event, trunk closing event, and/or hood closing event within a time period before and after a wake up event.

Audio data may be obtained (block 740). For example, data collector 420 may obtain microphone data from one or more microphones located in vehicle 110, such as a microphone located on the dashboard and providing audio data to vehicle computer device 110, a microphone located in OBD device 120, a microphone located in user device 130, and/or another type of microphone in vehicle 110. The audio data may include sound recordings of door slams and may include a door slam sound for each person that has entered vehicle 110.

Vehicle sensor data may be obtained (block 750). For example, data collector 420 may obtain data from one or more door sensors, data from one or more proximity sensors, data from a dashboard camera, data from one or more weight sensors, and/or data from other types of vehicle sensors. User device data may be obtained (block 760). For example, data collector 420 may obtain data identifying the number of detected short range wireless signals from user devices 130, such as Bluetooth discovery signals, WiFi discovery signals, and/or other types of short range wireless signals. As another example, data collector 420 may obtain data identifying the number of user devices 130 detected at the location of vehicle 110 by base station 145.

The obtained data may be classified (block 770) and the number of people in the vehicle may be determined based on the result of the classification (block 780). For example, data collector 420 may input the obtained data into classifier 470 and classifier 470 may output the number of people in vehicle 110 based on the inputted data and based on the classifier data stored in classifier DB 475.

One or more functions may be executed based on the determined number of people in the vehicle (block 790). As an example, people counter 400 may report the number of people in the vehicle to telematics system 150 and telematics system may provide the information to an insurance provider for keeping track of usage-based insurance information. As another example, vehicle 110 may be operated by a teenager and owned by the parents of the teenager. The parents may not wish for the teenager to drive vehicle 110 with other passengers. Thus, if the number of people in vehicle 110 is greater than one, people counter 400 may send an alert to a parent's mobile communication device.

As yet another example, one or more vehicle settings may be adjusted based on the number of people in the vehicle. People counter 400 may report the number of people in the vehicle to vehicle computer device 115 and vehicle computer device 115 may adjust one or more vehicle settings. For example, if people are sitting in the rear seats of the vehicle (e.g., if the number of people is greater than two), vehicle computer device 115 may increase the volume of the speakers in the rear of vehicle 110, may adjust the heating and/or air condition vents to increase the air flow in the rear of vehicle 110, and/or may move the front seats forward. Furthermore, if people are sitting in the rear seats, vehicle computer device 115 may activate and/or increase the sensitivity of safety devices for the rear of the vehicle, such as rear airbags and/or may activate rear seat belt alarms. Conversely, if people are not sitting in the rear, or if a person is not sitting in the front passenger seat, the settings may be adjusted for a sole driver.

Figure 8:
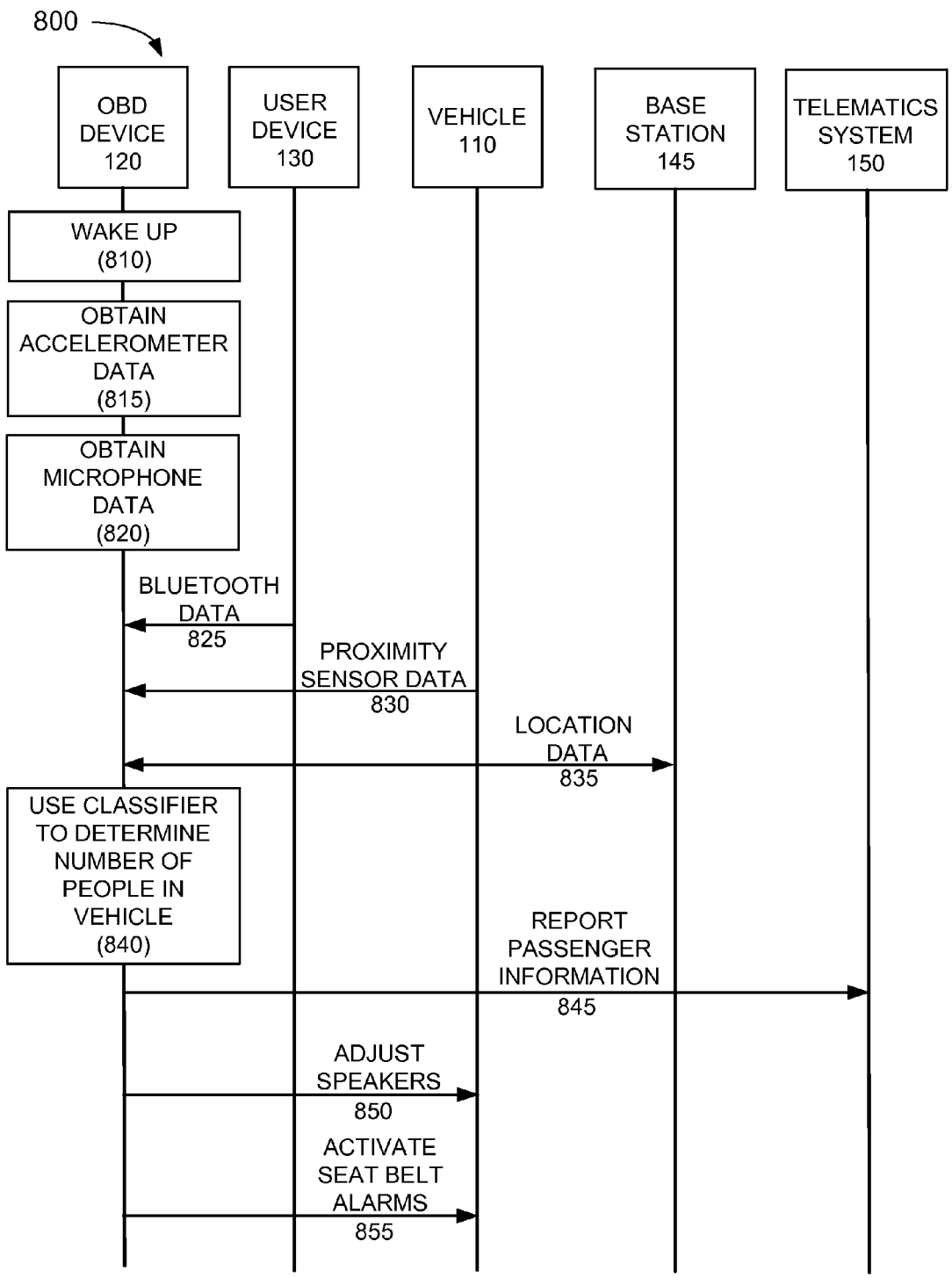
FIG. 8 is an exemplary signal flow diagram according to an implementation described herein.

FIG. 8 is an exemplary signal flow diagram 800 according to an implementation described herein. Signal flow 800 may include OBD device 120 waking up (block 810). For example, vehicle 110 may shake as a driver opens a door an accelerometer 260 may wake up OBD device 120. In response, OBD device 120 may obtain accelerometer data from accelerometer 260 (block 815) and may obtain microphone data from a microphone located in OBD device 120 (block 820). Furthermore, OBD device 120 may obtain Bluetooth data from user devices 130 of users entering vehicle 110 (signal 825), may obtain camera data from a dashboard camera via the OBD port of vehicle 110 (signal 830), and may obtain location data relating to user devices 130 from base station 145 (signal 840).

Assume three people entered vehicle 110, a driver and two people in the rear seats. Further, assume that the two people in the rear seats entered the vehicle through the same door, because a light post blocked the rear door on one side of vehicle 110. Thus, accelerometer 260 may record two door slam events and relying only on accelerometer data may not generate an accurate count of the number of people in vehicle 110. Furthermore, the microphone data may confirm the two door slam events and thus may also be not sufficient in this case to accurately determine the number of people in vehicle 110.

If all three people in vehicle 110 have user devices 130 (e.g., mobile phones), OBD device 130 may detect three Bluetooth signals. Furthermore, the proximity sensor located near the front door may detect one person entering vehicle 110 and the proximity sensor located near the rear door may detect two people entering vehicle 110. Additionally, base station 145 may report three user devices 130 within a particular region of vehicle 110 when OBD device 120 requests the location information from base station 145.

Thus, when the detected Bluetooth signals, location information, and proximity sensor signals are added to the accelerometer data and microphone data, and provided as inputs to classifier 470, OBD device 120 may determine that there are three people in vehicle 110. In response, OBD device 120 may report that there are three people in vehicle 110 to telematics system 150 (signal 845) and telematics system 150 may report the information to an insurance provider associated with vehicle 110. Furthermore, OBD device 200 may instruct vehicle 110 to adjust the speakers to increase the volume in the rear of vehicle 110 (signal 845) and may activate the seat belt alarms in the rear of the vehicle (signal 855) if the seat belts are not put on by the people in the rear of vehicle 110.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 6 and 7, and series of signal flows have been described with respect to FIG. 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   detecting, by the computer device, a wake up event that wakes the computer device from an idle mode, wherein the wake up event indicates that a user is getting ready to use a vehicle;
   obtaining, by the computer device, accelerometer data from an accelerometer, associated with the vehicle, during a time period that includes the wake up event;
   determining, by the computer device, a number of door slam events during the time period based on the obtained accelerometer data using a classifier trained using training data that includes accelerometer data for door slam events and accelerometer data for response events that do not correspond to door slam events to filter out accelerometer response events that do not correspond to door slam events; and
   determining, by the computer device, a number of people in the vehicle based on the determined number of door slam events.

2. The method of claim 1, wherein detecting the wake up event that wakes the computer device from an idle mode includes:
   detecting an unlocking of the vehicle;
   detecting an opening of a door of the vehicle; or
   detecting a short range wireless signal associated with a mobile communication device associated with the user.

3. The method of claim 1, further comprising:
   obtaining audio data from a microphone during the time period that includes the wake up event; and
   wherein determining the number of people in the vehicle is further based on the obtained audio data.

4. The method of claim 1, further comprising:
   obtaining data relating to mobile communication devices in the vehicle during the time period that includes the wake up event; and
   wherein determining the number of people in the vehicle is further based on the obtained data relating to the mobile communication devices.

5. The method of claim 4, wherein the data relating to the mobile communication devices in the vehicle includes data relating to at least one of:
   detected short range wireless signals associated with the mobile communication devices, or
   location data associated with the mobile communication devices received from a base station.

6. The method of claim 1, further comprising: obtaining data from one or more additional sensors in the vehicle during the time period that includes the wake up event; and wherein determining the number of people in the vehicle is further based on the obtained data from the one or more sensors in the vehicle.

7. The method of claim 6, wherein the one or more additional sensors in the vehicle include at least one of: a door sensor, a proximity sensor, a dashboard camera, or a weight sensor.

8. The method of claim 1, further comprising:
   providing information identifying the number of people in the vehicle to a device configured to collect usage-based insurance information.

9. The method of claim 1, further comprising:
   determining that the number of people in the vehicle exceeds a passenger threshold; and
   sending an alert to a mobile communication device, in response to determining that the number of people in the vehicle exceeds the passenger threshold.

10. The method of claim 1, further comprising:
    adjusting one or more vehicle settings, based on the determined number of people in the vehicle.

11. A computer device comprising:
    logic configured to:
    detect a wake up event that wakes the computer device from an idle mode, wherein the wake up event indicates that a user is getting ready to use a vehicle;
    obtain accelerometer data from an accelerometer, associated with the vehicle, during a time period that includes the wake up event;
    determine a number of door slam events during the time period based on the obtained accelerometer data using a classifier trained using training data that includes accelerometer data for door slam events and accelerometer data for response events that do not correspond to door slam events to filter out accelerometer response events that do not correspond to door slam events; and
    determine a number of people in the vehicle based on the determined number of door slam events.

12. The computer device of claim 11, wherein the computer device includes an on-board diagnostics device.

13. The computer device of claim 11, wherein the computer device includes:

a server device communicating with an on-board diagnostics device;
an embedded vehicle computer device; or
a mobile communication device located within the vehicle.

14. The computer device of claim 11, wherein, when detecting the wake up event that wakes the computer device from an idle mode, the logic is further configured to at least one of:
   detect an unlocking of the vehicle;
   detect an opening of a door of the vehicle; or
   detect a short range wireless signal associated with a mobile communication device associated with the user.

15. The computer device of claim 11, wherein the logic is further configured to at least one of:
   obtain audio data from a microphone during the time period that includes the wake up event;
   obtain data relating to mobile communication devices in the vehicle during the time period that includes the wake up event; or
   obtain data from one or more additional sensors in the vehicle during the time period that includes the wake up event; and
   wherein the logic is further configured to: determine the number of people in the vehicle based on at least one of the obtained audio data, the obtained data relating to the mobile communication devices in the vehicle, or the obtained data from the one or more sensors in the vehicle.

16. The computer device of claim 11, wherein the logic is further configured to at least one of:
   provide information identifying the number of people in the vehicle to a device configured to collect usage-based insurance information;
   sending an alert to a mobile communication device when the number of people in the vehicle exceeds a passenger threshold; or
   adjust one or more vehicle settings, based on the determined number of people in the vehicle.

17. An on-board diagnostics device comprising:
   logic configured to:
      detect a wake up event that wakes the on-board diagnostics device from an idle mode, wherein the wake up event indicates that a user is getting ready to use a vehicle;
      obtain accelerometer data from an accelerometer, associated with the vehicle, during a time period that includes the wake up event;
      obtain data that includes one or more of:
         audio data from a microphone during the time period that includes the wake up event;
         data relating to mobile communication devices in the vehicle during the time period that includes the wake up event; or
         data from one or more additional sensors in the vehicle during the time period that includes the wake up event;
      determine a number of door slam events during the time period based on the obtained accelerometer data using a classifier trained using training data that includes accelerometer data for door slam events and accelerometer data for response events that do not correspond to door slam events to filter out accelerometer response events that do not correspond to door slam events; and
      determine a number of people in the vehicle using the classifier based on the determined number of door slam events and the obtained data.

18. The on-board diagnostics device of claim 17, wherein the classifier includes at least one of:
   a neural network classifier;
   a support vector machine classifier; or
   a logistic regression classifier.

19. The on-board diagnostics device of claim 17, wherein the response events that do not correspond to door slam events include at least one of:
   a trunk closing event;
   a hood closing event;
   a passing vehicle event; or
   a heavy object being placed in the trunk event.

20. The on-board diagnostics device of claim 17, wherein the logic is further configured to at least one of:
   provide information identifying the number of people in the vehicle to a device configured to collect usage-based insurance information;
   send an alert to a mobile communication device when the number of people in the vehicle exceeds a passenger threshold; or
   adjust one or more vehicle settings, based on the determined number of people in the vehicle.

* * * * *